Figure 6:
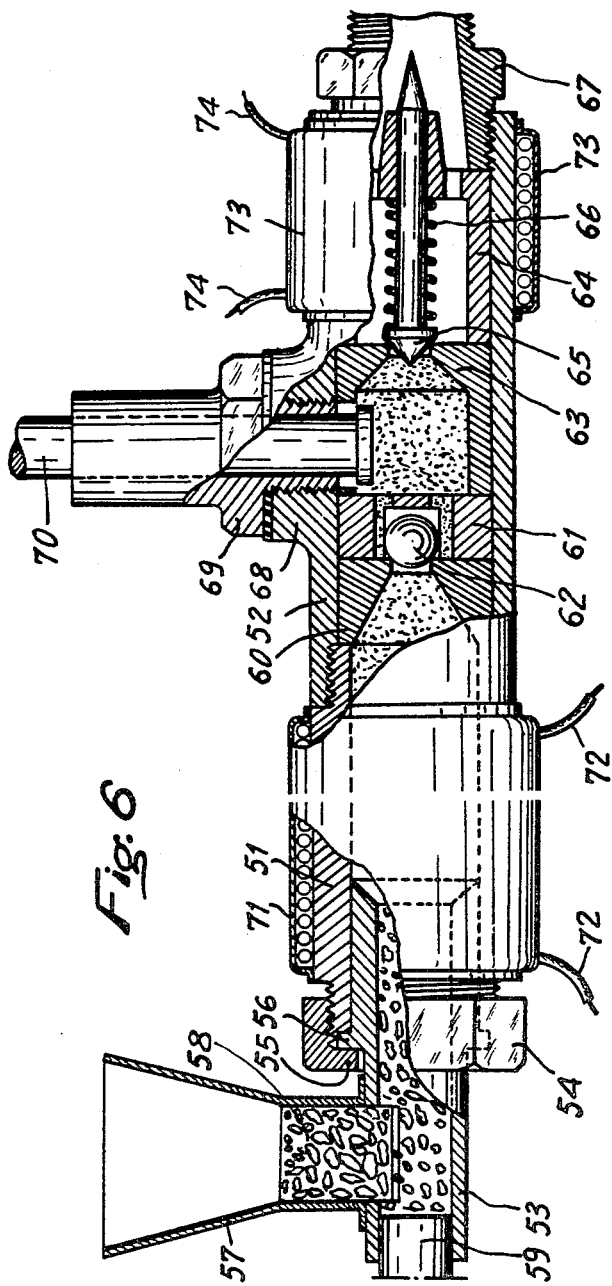

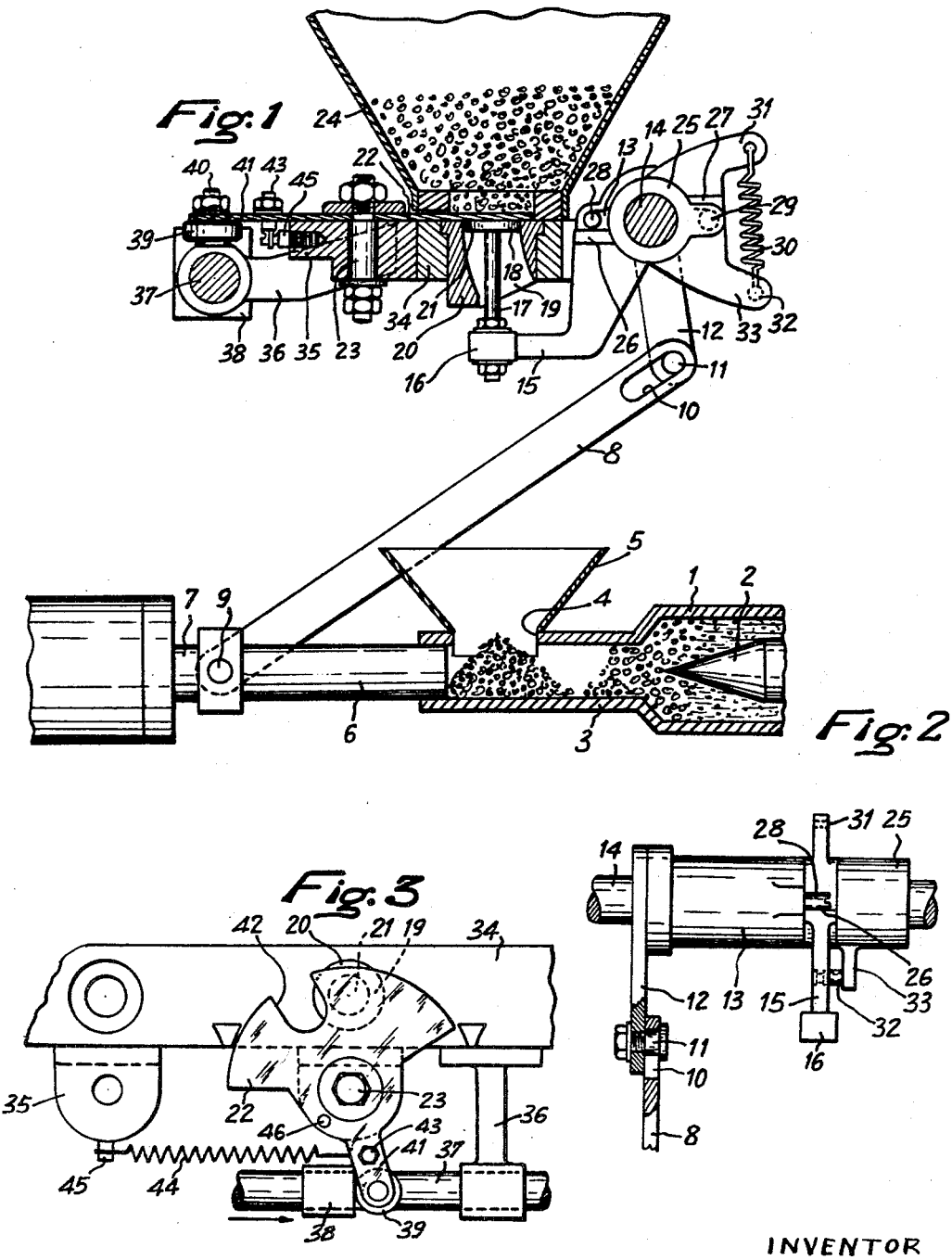

March 23, 1965 J. TEILLAC 3,174,186
APPARATUS FOR PROVIDING SMALL QUANTITIES
OF THERMOPLASTIC MATERIALS
Filed June 27, 1961 4 Sheets-Sheet 2

INVENTOR
JACQUES TEILLAC
By Linton and Linton
ATTORNEYS

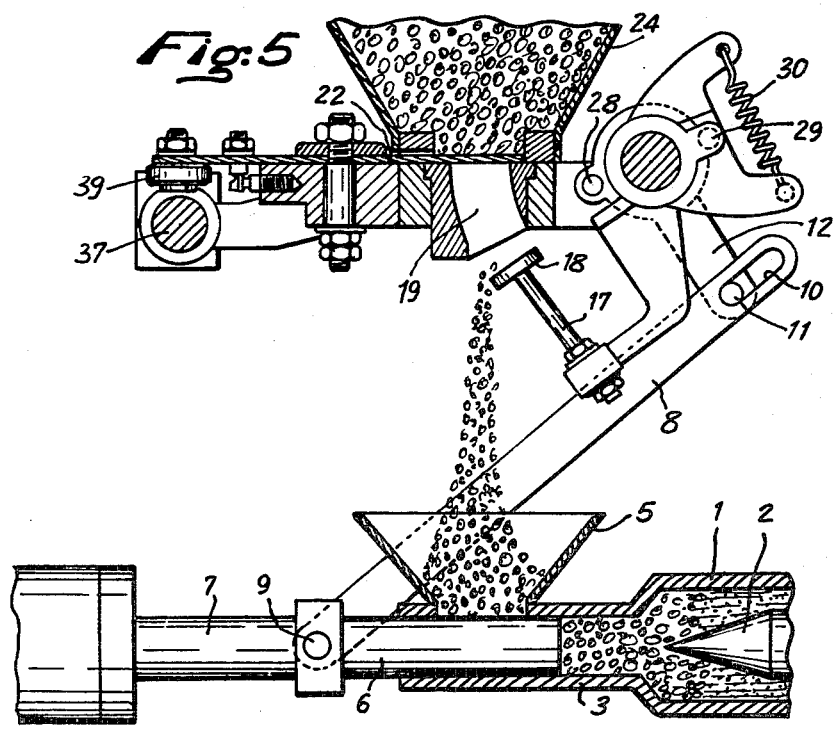

March 23, 1965 J. TEILLAC 3,174,186
APPARATUS FOR PROVIDING SMALL QUANTITIES
OF THERMOPLASTIC MATERIALS
Filed June 27, 1961 4 Sheets-Sheet 4

INVENTOR
JACQUES TEILLAC
By Linton and Linton
ATTORNEYS

United States Patent Office 3,174,186
Patented Mar. 23, 1965

3,174,186
APPARATUS FOR PROVIDING SMALL QUANTITIES OF THERMOPLASTIC MATERIALS
Jacques Teillac, Vaucresson, France, assignor to Alca S.A., Paris, France, a corporation of France
Filed June 27, 1961, Ser. No. 119,875
Claims priority, application France, June 30, 1960, 831,623, Patent 1,269,284
2 Claims. (Cl. 18—30)

The present invention is concerned with an apparatus for providing small quantities of thermoplastic materials in dosed volumes and of a pasty consistency.

For many applications of polymerized thermoplastic materials it is desirable to obtain by extrusion small masses of a pasty consistency and dosed volume for their subsequent transformation into molded articles by compression in a chilled mold. This mode of operation is particularly suitable for the manufacture of small articles the material for which may be administered in doses in the form of pasty drops collected at the outlet of an extrusion nozzle and compared with the usual injection molding process it has the advantage of avoiding the resulting losses which inevitably occur when removing the injection core. The waste may in these cases be quite a considerable fraction of the amount injected in cases when small articles are being dealt with.

It has already been proposed to ensure precise volumetric dosage when extruding masses of thermoplastic material by obtaining these masses by fusion or melting of a stick of this material the rate of feed of which is controlled at the inlet of a fusion and extrusion vessel, but the use of the starting material in the form of a thin stick raises difficulties when the materials cannot be prepared in the form of flexible sticks which can be wound and rolled and there is the further disadvantage that it is necessary to convert the material first into such a thin stick by an intermediate heating and pressing operation.

The main aim of the invention is to obviate these disadvantages and to obtain dosed volumes of these pasty substances directly from solid fragments of the thermoplastic material, for example in the form of granules. The invention is also applicable to direct injection of the thermoplastic material into a mold.

The apparatus for providing small quantities of thermoplastic materials according to the invention essentially comprises a fusion vessel with a feed device for fragmented thermoplastic material, a heated device and device for exerting pressure on the liquefied material, and a dosing chamber fed by the fusion vessel across a retaining valve and provided with an extruding and dosing device and an outlet nozzle fed by the dosing chamber across a spring valve which remains closed for the maximum feed pressure of the device and opens only under the pressure exerted by the extrusion and dosing device.

The pressure providing device and the dosing and extruding device are advantageously in the form of rams, pistons or plungers with adjustable excursions and actuated by hydraulic jacks.

It is however important that the granules provided by the feed piston should themselves first be dosed in order to ensure automatic functioning of the machine which might be impaired if there is a great excess or lack in the quantity of granules supplied.

The control of the feed piston is generally so arranged that the piston exerts a pressure determined by the desired stroke. This stroke being variable, the process of predosing the granules received by the piston consists according to the invention in measuring a volumetric dose of the granules by a mechanism operated by the length of stroke of the feed piston in such a manner that this dose is a function of this stroke and varies in the same sense, this dose being then transferred to the cylinder in which the feed piston moves.

If owing to an insufficient amount of granules having been supplied, the feed piston makes a greater stroke before reaching the final pressure which determines the end of its stroke, this increase in its stroke will automatically bring about an increase in the dose of granules provided to the cylinder of this piston and an automatic correction in the rate of feed to the heating vessel will therefore be effected.

It will be understood that an automatic machine may comprise a number of heating vessels each having an ejection head and that each heating vessel will be associated with a predosing device for the granules controlled as has been described above by the feed piston of the corresponding heating vessel.

The predosing device for use in the above apparatus advantageously comprises a reserve of granules above an automatic shutter the opening of which allows the granules to descend into a predosing chamber which is limited by a movable predosing element controlled by the feed piston while another control device of this predosing element, independently of the feed piston, releases the dose and ensures its transfer to a hopper associated with the cylinder of the feed piston to enable the cylinder to receive the desired dose of granules.

According to one embodiment of the invention which appears to be particularly advantageous, the predosing chamber is in the form of a toroidal portion and the predosing element which does not move inside this chamber is in the form of a movable flat surface capable of turning downwards on the one hand about the axis of the toroid under the action of the feed piston during the opening of the shutter and on the other hand under the action of an independent automatic emptying device which ensures the emptying of the predosing chamber after the shutter above this chamber has been closed.

The dosing plate is advantageously rigidly connected to a lever which is rotatable about the axis of the toroid and this lever is connected to two concentric shafts one of which is connected to the feed piston and the other to the control device for emptying so that the dosing plate effects for each dosage the first movement controlled by the feed piston during the opening of the shutter to determine the volume of the dose and then the complementary movement controlled by the emptying shaft and after the closure of the shutter to ensure the emptying of the predosing chamber and the transfer of the granules to the cylinder of the feed piston, these two movements being followed by return movements after emptying of the predosing chamber.

To make the invention more clearly understood a description will be given below of one embodiment of the invention with reference to the accompanying drawings in which FIGURE 1 is a vertical section of the predosing device associated with a heating and plastifying vessel, FIGURE 2 is a side view of the control mechanism for the movable predosing device (viewed from the left of FIGURE 1), FIGURE 3 shows on slightly smaller scale a plan view of the control of the shutter ensuring the feed to the predosing chamber.

FIGURES 4 and 5 are views similar to FIGURE 1 but in different positions of the operation, FIGURE 6 is a view with a partial section of an injection apparatus similar to that of which the feed device has been shown in FIGURES 1, 4 and 5.

In FIGURE 1, the reference numeral 1 indicates one of the plastifying heating vessels of the automatic machine for the formation of plastic masses in dosed volumes. This heating vessel 1 contains the usual torpedo 2 to guide the flow of the material towards the right of FIGURE 1 and is provided with the usual heating means (not shown). It is preceded by a feed cylinder 3 comprising an upper opening 4 equipped with a feed hopper 5 into which the granulated material predosed in accordance with the invention is placed. Inside the cylinder 3 moves the feed piston 6 automatically actuated by the rod 7 of a hydraulic jack and connected by a linkage 8 articulated to the piston at 9 to a predosing mechanism associated with the heating vessel. At the end opposite to the joint 9, the linkage 8 has an elongated slot 10 through which passes the stub axle 11 which is carried by a shaft 12 rigidly connected to a sleeve 13 which can turn on a shaft 14 (FIGURE 2). On the shaft 14 and at the side of the sleeve 13 there is rotatably mounted the hub of a lever 15 the end 16 of which carries the rod 17 of the movable predosing device 18 which is in the form of a circular plate. This predosing element moves inside a chamber which is in the form of a toroidal portion 19 provided inside the fixed predosing element 20 below a feed opening 21 which is controlled by a shutter 22 which pivots about a vertical axis 23. The predosing chamber is fed by a hopper 24 containing a reserve of granular material. It will be understood that the axis of the toroid of the chamber 19 coincides with the axis of the shaft 14.

At the side of the lever 15 opposite the sleeve 13, the shaft 14 carries a sleeve 25 and the hub of the lever 15 carries two shoulders 26, 27 which are directed radially towards the exterior and on which may act the lugs 28 and 29 carried respectively by the sleeve 13 and the sleeve 25 to rotate the lever 15 in the sense which effects the lowering of the predosing element 18 for refilling the chamber 19 above this element and then for emptying this chamber and the chute of its contents into the feed hopper 5.

A traction spring 30 is hooked at its ends on the one hand to the end 31 of the lever 15 and on the other hand to a finger 32 carried on an arm 33 of the sleeve 25, this spring tending to recall the shoulder 27 of the lever 15 against the stop 29 of the sleeve 25.

The reference numeral 34 indicates the support for the predosing device 20, the reference numeral 35 indicates the support for the shutter 22, and the reference numeral 36 indicates the support of a sliding bar 37 for controlling the closure of the shutter 22. This bar 37 carries an adjustable stop 38 which is designed to act by pushing on a roller 39 of the shutter. This roller 39 is mounted on a shaft 40 carried by a horizontal end portion 41 of the shutter. The effective part of the shutter is in the form of a horizontal section comprising a recess 42 for uncovering the opening 21 when it is in line with this opening. The end portion of the shuter carries a shaft 43 to which is hooked the end of a return spring 44 the other end of which is hooked at a fixed point 45 which may be provided on the support of an adjacent shutter (FIGURE 3), the role of this spring being to recall the shutter in the opening position when the stop 38 on the control bar 37 moves back. The hub of the shutter which moves on its support 35 contains an aperture 46 which is designed to cover a corresponding aperture of the support 35 when the shuter 22 is in the closing position so that this shuter may be fixed in this position by the insertion of a peg in the two holes which are in line with each other. This puts the predosing apparatus out of action as well as the heating vessel associated with it while leaving in operation other predosing apparatus and heating vessels of the automatic machine.

It will be understood that the automatic machine may comprise a number of predosing devices associated with an equal number of heating vessels. These predosing devices may be arranged in a line and a common shaft 14 and a common bar 37 may be provided for the different predosing devices.

The mode of operation of the predosing device according to the invention will now be described.

When the piston 6 has moved back under the action of its automatic control (FIGURE 1), it has set free the portion of the cylinder 3 comprising the feed opening 4 so that the predosed material previously contained in the feed hopper 5 falls into the cylinder and is ready to be driven along by the piston 6. The return of the piston has moved towards the left in FIGURE 1 the shaft 12 of the sleeve 13 and enabled the predosing device 18 to ascend under the action of the return spring 30. The shutter 22 is now held in the closing position by the advance of the sliding bar 37.

When the piston 6 advances to the end of its stroke which is determined by the development of a predetermined pressure in the vessel 1 (FIGURE 4) it carries with it the linkage 8, the slot 10 of which first moves relative to the stub axle 11 until the latter is at the left or bottom of this slot after which the linkage moves by means of this stub axle 11 the shaft 12 and the sleeve 13 the stop 28 of which moves the lever 15, thereby lowering the predosing device 18, the level of the latter depending on the stroke of the piston 6. Meanwhile the return of the bar 37 has enabled the spring 44 to return the shutter 22 into the opening position so that the material from the hopper 24, falling through the opening 21, has filled the portion of the chamber 19 situated above the predosing device 18, the volume of this portion depending on the advance of the piston 6 as explained above.

After the piston has arrived at the end of its stroke, the bar 37 controls the opening of the shutter 22, and the shaft 14 turns anticlockwise through a certain angle. The closing of the shutter stops the feed across the opening 21, while the rotation of the shaft 14 and of the sleeve 25 fixed on it moves the lever 15 by the stop 29 to produce a corresponding descent of the predosing device 18 which uncovers the base of the chamber 19 so that the predosed material can drop into the feed hopper 5 and is emptied from the chamber 19 (FIGURE 5).

When the chamber 19 is empty, the shaft 14 returns to its initial position and the spring 30 recalls the lever 15 in the clockwise sense until its shoulder 26 abuts against the stop 28, so that the predosing element 18 returns into the chamber 19 where it continues to ascend during the return movement of the piston 6 and of the linkage 8 which will rotate the sleeve 13 and return the stop 28 to the position shown in FIGURE 1. During this return of the piston 6, the predosed material already received in the feed hopper 5, will fall into the cylinder 3 as explained above and the cycle of operations will continue indefinitely.

A form of construction of an injection apparatus will now be described with reference to FIGURE 6.

In the example shown the body of the extrusion apparatus comprises two successive cylindrical jackets 51, 52 assembled with each other, for example by screwing, the jacket 51 forming the melting vessel similar to the vessel 1, whereas the jacket 52 is designed to contain the retaining valve, the dosing chamber, and the outlet valve, and to contain the extrusion nozzle at the end.

At its inlet, the jacket 51 receives a feed cylinder 53 corresponding to the cylinder 3 in FIGURES 1, 4 and 5, and fixed for example by a flanged threaded ring 54 which is screwed to the threaded end of the jacket 51 and the flange 55 of which holds a peripheral flange 56 of the cylinder 53. The cylinder 53 comprises a lateral opening receiving the base of a feed hopper 57 containing thermoplastic material 58 in the form of solid fragments, for example in the form of granules, this material having been predosed as explained with reference to the FIGURES 1 to 5. An extrusion piston 59 whose excursion is adjusted by a hydraulic jack exerting a limited pressure may move in the inlet end of the cylinder 53 situated on the far side of the feed hopper 57.

The inside of the jacket 52 contains successively the seat 60 of the retaining valve with a convergent conical inlet, the valve holder 61 containing the ball circuit 62 of the retaining valve, the body 63 of the dosing chamber with a convergent conical outlet forming the seat of the outlet valve and the guide 64 of the outlet valve supporting the outlet valve 65 which is returned into the closing position by the spring 66. At its outlet, the jacket 52 has attached to it, for example by screwing, the extrusion nozzle or a connecting piece 67 prolonged by this nozzle.

At the level of the dosing chamber, the jacket 52 comprises threaded bossing 68 to which is attached the cylinder 69 which serves as guide for the dosing piston 70 actuated by a hydraulic jack and capable of exerting a pressure greater than that exerted by the piston 59 and sufficient to overcome the action of the return spring 66 which itself resists the pressure exerted by the piston 59.

The jacket 51 comprises a heating device which may be formed, for example, by an outer covering 71 containing a heating resistance supplied by current from the conductors 72. A heating device 73, which may also be formed by a heating resistance supplied by current from the conductors 74, is also provided around the outlet end of the cylinder 52, in particular for reheating the inside before the apparatus is again put into operation after it has been at rest.

This apparatus operates as follows. The piston 59 which has alternating movement extrudes into the cylinder 53 the thermoplastic material arriving from the hopper 57. Under pressure exerted by the piston 59, the liquefied material contained in the jacket 51 traverses the retaining valve 62 and enters the dosing chamber thereby causing the dosing piston 70 to return, the pressure exerted being insufficient to open the outlet valve 65. When the piston 59 has returned, the controlling hydraulic jack of the dosing piston 70 causes the latter to advance by applying sufficient extrusion pressure to open the outlet valve 65 against the action of its spring 66, the retaining valve 62 being closed. Thermoplastic material thus extruded from the dosing chamber flows across the guide 64 of the outlet valve, then across the nozzle and leaves in a pasty form, for example as a drop, at the opening of the nozzle. The mass formed at the outlet of the nozzle has a dosed volume which corresponds to the adjustable advance of the dosing piston 70, and at the end of the excursion of this piston, this mass may be collected by any convenient means to be molded.

It will be noted that the material will have to be cooled in the parts of the apparatus adjacent to the outlet in order that it may leave in a pasty consistency. The nozzle may be cooled by free air. It may also be provided with a device for reheating it when the machine is put into operation again.

It will be understood that the constructional example described above and shown in the appended diagrammatic drawings is in no way limiting and that various constructions may be provided and various additional modifications may be applied to it without thereby going outside the scope of the invention.

I claim:

1. Apparatus for providing small quantities of thermoplastic materials in dosed volumes of a pasty consistency comprising a heated vessel having a feed cylinder, a piston slideably operated in said cylinder, a feed opening in one side of said cylinder, a container for thermoplastic granules having a bottom opening, a shutter for opening and closing said container opening, a predosing chamber connected to said container and having a bore in communication with said container opening positioned for feeding granules to said cylinder side opening, a movable plate extending across said predosing chamber bore, means operatively connecting said piston and said moveable plate for movement together with said moveable plate moving in said predosing chamber a distance relative to the movement of said piston, means for moving said moveable plate to and from said predosing chamber bore for emptying granules therefrom into said cylinder, said predosing chamber bore having a toroidal configuration and said moveable plate being moveable about the axis of said toroid.

2. Apparatus for providing small quantities of thermoplastic materials in dosed volumes of a pasty consistency comprising a heated vessel having a feed cylinder, a piston slideably operated in said cylinder, a feed opening in one side of said cylinder, a container for thermoplastic granules having a bottom opening, a shutter for opening and closing said container opening, a predosing chamber connected to said container and having a bore in communication with said container opening positioned for feeding granules to said cylinder side opening, a moveable plate extending across said predosing chamber bore, means operatively connecting said piston and said moveable plate for movement together with said moveable plate moving in said predosing chamber a distance relative to the movement of said piston, and said operating means consisting of a pair of concentric shafts, means connecting one of said shafts to said piston, an arm connecting said plate and said one of said shafts and means independent of said piston carried by the other of said shafts for engaging said arm for withdrawing said plate from said chamber bore for at times emptying granules from said chamber bore into said cylinder resilient means tending to keep said plate in the upper end of said chamber bore.

References Cited by the Examiner
UNITED STATES PATENTS

| 2,033,735 | 3/36 | Pack | 18—12 |
| 2,351,454 | 6/44 | Peerles | 18—30 |
| 2,448,947 | 9/48 | Arthur et al. | 18—30 |
| 3,001,234 | 9/61 | Renier | 18—30 |

MICHAEL V. BRINDISI, *Primary Examiner.*

ROBERT F. WHITE, WILLIAM J. STEPHENSON,
*Examiners.*